Jan. 23, 1940.  H. L. HOYT.  2,187,804
BARREL MANUFACTURE
Filed April 8, 1936  2 Sheets-Sheet 1

INVENTOR:
Hazen L. Hoyt
BY H. R. Johns
his ATTORNEY.

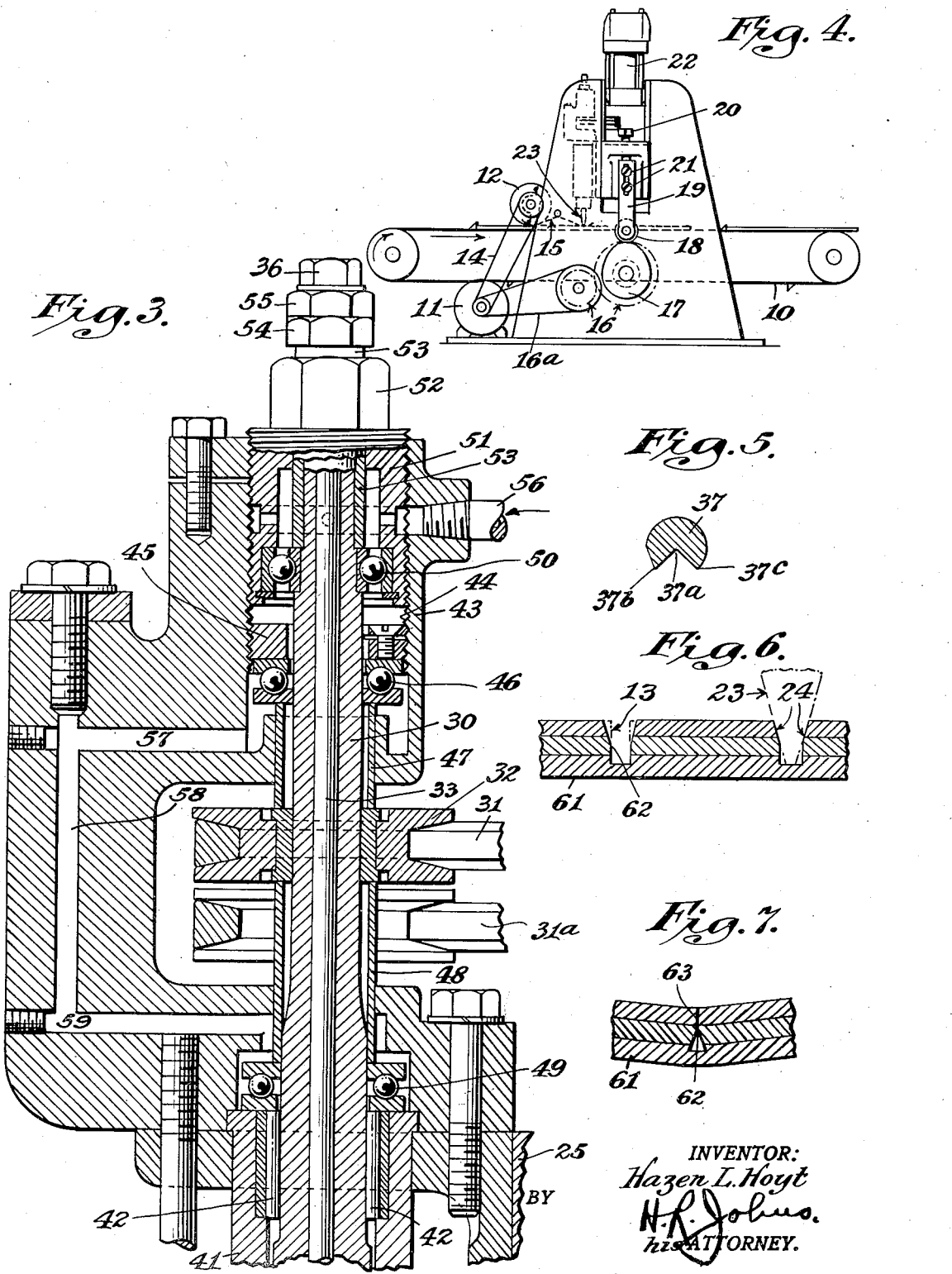

Patented Jan. 23, 1940

2,187,804

UNITED STATES PATENT OFFICE 2,187,804

BARREL MANUFACTURE

Hazen L. Hoyt, Great Neck, N. Y.

Application April 8, 1936, Serial No. 73,229

1 Claim. (Cl. 144—309)

This invention relates to a method and apparatus for conveniently and economically making bilge barrels. Another object is to provide an improved conical cutting tool for use in the manufacturing of such barrels.

A further object is to provide an improved product in which the bevelled side edges of the stave-like portions lie contiguous one another and have a good fit for a substantial part of their thickness.

Referring to the drawings,

Fig. 3 is a longitudinal section through the upper portion of the tool mounting.

Fig. 4 is a side view of one machine embodying this invention.

Fig. 5 is a transverse cross-section through a conical cutting tool according to this invention.

Fig. 6 is a section through the central portion of a sheet of material which has been slotted according to this invention.

Fig. 7 is a view similar to Fig. 6 but showing the sheet having been flexed.

The machine illustrated herein is adapted for the production of bilge barrels of the general type illustrated in my prior but copending Patent No. 2,037,025 dated April 14, 1936, filed June 23, 1934.

Figure 1:
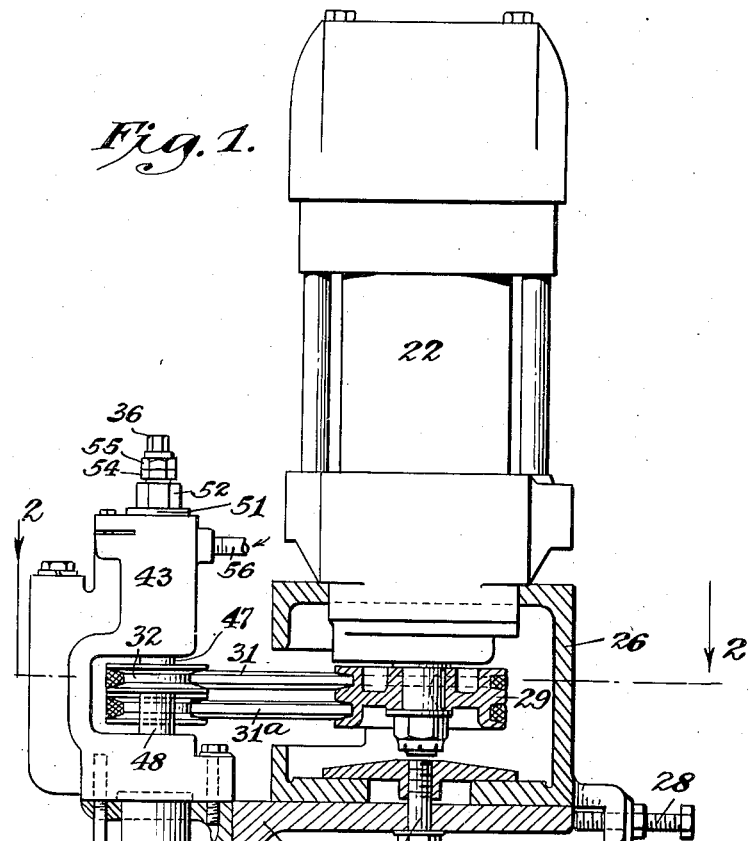
Fig. 1 is a side view partly in section showing the motor-driven conical tool and its mounting.

Referring to the drawings, the sheets of material which are to be slotted under this invention may be stacked in a magazine of the general type shown in Fig. 3 of my prior Patent No. 1,909,405 dated May 16th, 1933, from the under side of which sheets of material are taken one at a time by a flexible conveyor as illustrated in said prior patent. Such a conveyor 10 is shown in Fig. 4, although the magazine from which the sheets are extracted is not shown herein. The conveyor 10 then feeds the work across a work table not shown but which is preferably slotted to receive the chain conveyor. An electric motor 11 drives a circular saw 12 which is of a special type adapted to cut a very narrow slot 13 in the sheet of material. There are preferably a number of such saws, each mounted on the same shaft and driven by the flexible driving means 14 so that simultaneously a number of parallel slots are cut in the work. Due to the necessity for relieving the cutting edges, that is, providing adequate clearance, there is a limit to how narrow such a circular saw may be made, and it is contemplated to have the saw 12 capable of cutting slots 13 of a width about one-sixteenth of an inch. As the work is fed under the saws, spring fingers 15 hold the work tightly against the work table and prevent it from slipping or chattering under the saws. The work is then fed by the conveyor 10 forward into engagement with the cone-shaped cutting tools for widening the slots, and after passing out from cooperation with such tools, the work may be discharged from the carrier 10 on to another carrier moving at right angles to the first carrier as is shown in Fig. 1 of the prior Patent 1,909,405. This second-mentioned carrier is for the purpose of feeding the work while the croze slots are being cut. The motor also drives the reduction gearing 16 through the chain or belts 16a, such gearing in turn driving the cam 17 for the purpose of raising and lowering the cone cutters with respect to the work, for tapering and deepening the stave slots at the ends of the barrel in order to give the bilge effect thereto as is described in my prior Patent 2,037,025. The carrier 10 is driven from the motor 11 or from some other motor not shown. There are preferably two cams 17, one on each side of the machine, for raising and lowering not only the cone cutters but also their driving motors and belting. Cam rollers 18 engage the cam 17 and raise or lower the push rods 19 carrying the angle iron 25 on which the motors and tools are mounted. To provide adjustment of the angle iron and motor with respect to the cam, there are provided adjusting screws 20 and clamp nuts 21. In the improvement illustrated each motor 22 drives a battery of four cone cutters 23 which are for the purpose of widening the saw slots. Depending on the width of the work and the number of slots, there may be a number of sets of motors and tools.

After the circular saw has cut slots 13 which are substantially rectangular in cross-section as shown in Fig. 6, the cone cutters 23 of the general shape indicated in Fig. 6, serve to widen the slots by tapering the side walls 24 thereof as shown in Fig. 6. In operation the cone cutters, during the step of widening the slots preferably have their lower end adjacent the bottom of the slots 13 as shown in Fig. 6. The apex or lower end of the cone cutter comes as near to a point as is practicable.

Sliding in the vertical guide ways shown in Fig. 4, and moved up and down by cam 17 and the cam roller 18 is an angle iron 25 supporting a number of electric motors, each driving a plurality of the conical cutting tools 23. Each motor is separately supported on a bracket 26 which is adjustable both longitudinally and transversely of the angle iron support by means of the clamp bolts 27 and 28.

Figure 2:
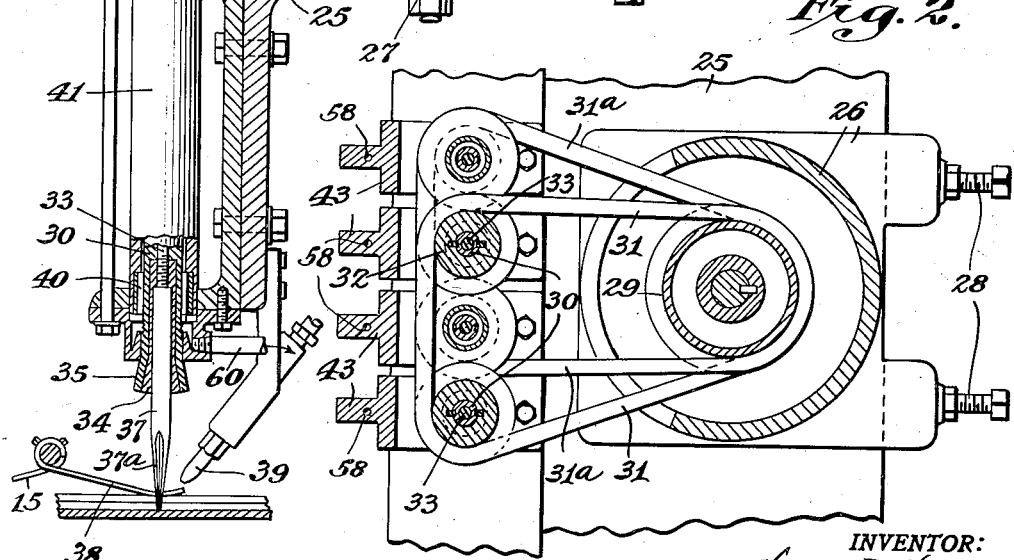
Fig. 2 is a section on the line 2—2 of Fig. 1.

Carried on the lower end of the motor shaft is a pulley 29 provided with the two grooves illustrated for driving each of a number of rotatable spindles 30 carrying the cone cutters 23. Belts 31 and 31a drive a battery of tools from a single motor; as shown in Fig. 2 one motor drives four spindles, the belt 31 passing around spindles number 1 and 3 from the bottom, whereas the other belt 31a passing around the other grooves of the pulley 29 drives the spindles numbered 2 and 4 from the bottom in Fig. 2. On the angle iron support 25 there are preferably mounted several motors, each driving a battery of spindles, the number of motors and cone cutters depending on the number of staves. In order to space the cone cutters 23 close enough together, the drive pulleys on adjacent spindles are arranged in different planes, which permits bringing the spindles closer together than would be otherwise possible if the driving pulleys were all in the same plane.

In Fig. 3 the belt 31 drives the pulley 32 mounted on the rotatable spindle 30. Passing through the spindle 30 for rotation therewith is an inner spindle 33 which serves to raise or lower the wedging sleeve 34 within the lower flared or enlarged end portion 35 of the spindle 30. On tightening the nut 36 on the end of the inner spindle 33, this spindle is raised, which raises the slit wedging sleeve 34 and tightly clamps tool 23 in position.

In Fig. 5 is illustrated a transverse cross-sectional view through an operative end portion of the conical cutting tool 23. The semi-circular cone cutter illustrated in Figs. 6 and 7 of the prior Patent 1,909,405, was found to cut a slot which was not as uniform and regular along its sides as was desired.

In the present conical cutter the cutting edge is backed up by the body 37 of the tool which is of greater angular extent so that the cutting edge 37b is stiffened against springing away from the work as shown in Fig. 5. The body 37 of the tool thus extends more than 180° while the cut away portion 37a is less than such amount and is just large enough to insure freedom of the chips getting clogged therein. Both edges 37b and 37c are not sharpened and relieved but only one edge in a given tool, depending on its direction of rotation. In Fig. 5 only the edge 37b is sharpened and relieved.

For holding the work down upon the work table adjacent each cone cutting tool, there are provided a number of spring fingers 38, such as were described in the prior Patent 1,909,405. A nozzle 39 for blowing compressed air into the slots cut by the circular cutters 12 and by the cone cutters 23, assists in keeping the slots clear of chips and sawdust.

As shown in Figs. 1 and 3, a stationary housing 41 surrounds and guards each rotating spindle 30. Roller bearings 40 and 42 guide the rotatable spindle 30 within the housing 41. An upper stationary housing 43 is internally threaded at 44 for reception of a threaded washer 45 which lies contiguous the ball bearing unit 46 for transmitting any end thrust between the pulleys and housing 43. The spacing sleeve 47 positions the pulley 32 longitudinally along the rotatable spindle 30, and on the opposite side of the pulley 32 a longer spacing sleeve 48 extends from the pulley to a ball bearing unit 49 on which the sleeves and pulleys may be mounted, said ball bearing unit resting on top of the stationary housing 41 as shown in Fig. 3. Another ball bearing unit 50 is located within the threaded plug 51. A nut 52, extending beyond and integral with the plug 52, provides a means for insertion and removal of the plug 51 within the stationary housing 43. The sleeves 47 and 48 also steady the pulley on the spindle 30 owing to the sliding fit of the pulley.

A rotatable sleeve 53 extends around the spindle 30 and engages the inner race ring of the ball bearing 50. This sleeve 53 extends axially beyond the nut 52, where it may be engaged by a clamp nut 54 threaded on the rotatable spindle 30. The sleeve 53, tends to support the rotatable spindle on the ball bearing unit 50. A lock nut 55 assists in keeping the nut 54 in adjusted position. For lubricating the rotatable spindle, oil enters the inlet 56, passes through the ball bearing units 50 and 46 through the passages 57, 58 and 59, thence through the ball bearing unit 49, roller bearings 42, around the rotatable spindles to the roller bearings 40 on the lower end portion of the spindle and thence out the oil delivery pipe 60.

As described in my prior patents, 2,037,025, 1,909,405, 1,922,588 and 1,775,224, the sheet material or work to be operated upon in the formation of the stave slots, is preferably plywood having the grain in some of the plies at substantially right angles to one another for the purpose of lessening any tendency for the plywood to expand and contract with changes in temperature and humidity. Other materials than plywood may be used in the formation of the bilge barrels of this invention. In Fig. 6 of the drawings, is illustrated, a sheet of three-ply plywood 61, in which a number of the stave-forming slots are cut. An advantage in first forming the slots by means of a rotary cutter 12 and then widening or bevelling the upper portions of such slots by means of a cone cutter 23, when the lower end of the cone cutter is located substantially adjacent the bottom of the slot, resides in the formation of a ridge 62 extending longitudinally of the slots, this ridge being formed between the bevelled portions 24 of the slot walls and the substantially straight or vertical portions of the slot walls which were originally cut by the circular saw. An advantage in such ridge 62 resides in the fact that the sheet of material when flexed about the head of a barrel has the side walls of the slots so shaped that instead of being contiguous only adjacent the outer end portions of the stave slots, as shown in Fig. 7 the side walls of the slots are contiguous for a substantial radial distance 63 inwardly from the ridge 62. Radially inside the ridge 62 is formed the requisite clearance space necessary for distributing the flexure of the fibers of the outer ply.

In operation, a sheet of material is withdrawn from the stack by the carrier 10 and fed across a work table under the gang of circular saws 12 which cut a number of parallel slots through two or more of the plies and part way through the bottom or outer ply. The slots cut by the circular saws are preferably of uniform depth. After passing under the saws 12, the work next passes under the cone cutters 23 which widen the slots as indicated in Fig. 6. Due to the necessity of having the staves tapered, or in other words, having the stave slots of gradually greater depth at the ends of the sheet than at the middle, as was described in prior Patent 2,037,025, in the present process the deepening of the stave slots is accomplished entirely by the cone cutters 23 which are automatically raised and lowered with respect to the work in timed relation to the travel of the work through the machine by means of the cam 17 raising and lowering the angle iron head 25 carried in the vertical guide-ways shown.

As the sheet of material approaches the cone cutters, said cutters are in a lowered position and as the cutters 23 move into the sheet of material, they are gradually raised by the cam until in the main body portion of the sheet the lower end portion of the cutters 23 is substantially on the level or adjacent to the bottom of the slot cut by the circular saws. In this way the ridge 62 extends mainly in the central body portion of the sheet and toward each end the ridge 62 slopes downwardly until at the ends it disappears due to the penetration of the cone cutters entirely through the sheet. After being raised and traveling through the central portion of the sheet, the cone cutters are again lowered gradually as the rear end of the sheet is approached. After passing under the cone cutters, the carrier 10 delivers the slotted sheets to a second carrier for conveying the sheets under the croze cutters as described in prior Patent 1,909,405. It will be understood that the sheets formed under the present invention are adapted for forming bilge type barrels of the kind illustrated in prior Patent 2,037,025.

Instead of having the sheet flat and raising and lowering the cone cutters in timed relation to the work travel, it will be understood that, if desired, the work sheets may be bowed as was suggested in Fig. 3 of prior Patent 2,037,025 to do away with the necessity of having the cutters raised and lowered with respect to the work. Yet the stave-forming slots are still tapered and deepened at their ends. While this invention is intended primarily for operation upon sheets forming connected staves, nevertheless, it is also useful in connection with a plurality of individual staves arranged longitudinally side by side, in which case the cone cutters bevel the edges and taper the staves to give the necessary bilge effect.

A bilge type barrel having staves with tapered end portions is generally amply reinforced against longitudinal thrusts on the individual staves; however, if desired, the staves of such bilge type barrels may nevertheless be still further strengthened by having the cone cutters 23 oscillated laterally in timed relation to the work travel to provide the sinusoidally serrated stave edges of prior Patent 1,909,405. It will be understood that the advantages in having the ridge 62 formed in the sides of the stave slots so that a large proportion of the stave side edges may fit or abut one another as shown in Fig. 7, is a feature which is not limited to bilge type barrels. In other words, stave slots of the form shown by Figs. 6 and 7 are adapted for use also in cylindrical barrels of the type shown in prior Patents 1,775,224 and 1,922,588, either with or without integral or other reinforcement. In practice, it has been found desirable for the cone cutters to rotate at a high speed, such as eight to ten thousand revolutions per minute, and this high speed makes it unnecessary for the cone cutters to have a point in order to penetrate the work, since the bottom of the cutters may also have a cutting edge. As shown in Fig. 5 the tool body portion 37 adjacent the cutting edge 37b or 37c is relieved or given the requisite clearance necessary for any cutting edge. Of course, whether the edge 37b or 37c is a cutting edge depends on the direction of rotation of the tool. An advantage in a cone type cutter of this sort lies in the ability of the tool to be ground without changing its shape. As has been stated in some of the previous patents referred to, the sheet of material may be either natural or synthetic fibrous sheets than the plywood mentioned.

In the preferred embodiment the circular saws 12 are preferably not raised and lowered with respect to the work sheet, but, if desired, it will be understood that these saws may also be raised and lowered with respect to the work to deepen the stave-forming slots adjacent the ends of the sheet. In this last event it will be necessary to provide either a flexible shaft or a separate motor drive for these circular saws or else to raise and lower the work and the carrier with respect to the saws. The necessity for adequate clearance or relief for the cutting edges of a circular saw makes it impossible to provide a circular saw which is adapted to cut a V-shaped slot in which the vertex of the V is at all sharp. On the other hand circular saws can be designed to cut stave-forming slots for a width of about one-sixteenth of an inch on the bottom. Due to the weight of the several motors and their gangs of cone cutters, it will be understood that no springs or other means than gravity are necessary to maintain the cam roller 18 in constant contact with the cam 17. If it is desired to cut stave-forming slots closer together than may be provided by having the cutters arranged as shown in Fig. 2, with the pulleys slightly overlapping, such may be accomplished by having adjacent cone cutters staggered or arranged in front and back of one another, whereby they may be spaced as closely as desired. The use of such cone cutters in staggered relation was illustrated in prior Patent 1,909,405. The use of the circular saw in advance of the conical cutter relieves the cone cutter of much of the work it would otherwise have to do.

I claim:

The method of forming a slot in a sheet of material from side to side of said sheet, which slot has a central portion of uniform depth with a flat bottom and substantially parallel lower sides terminating in bevelled upper sides, the bevel increasing and the substantially parallel sides diminishing in depth toward each side of said sheet until the bevel extends completely through the sheet, comprising the steps of cutting a uniform narrow slot with substantially parallel sides and a flat bottom entirely across said sheet to the uniform depths of said central portion, and rotating a conical cutter with its axis of rotation perpendicular to said sheet and passing the cutter along the narrow slot from one side to the other side of the sheet, having the point of the cutter below the bottom of the sheet as it enters the slot from one side, to cut through the bottom of the slot and bevel the sides thereof, gradually raising the cutter until, at the central portion of the slot, only the upper portions of the parallel sides of the slot are bevelled and then gradually lowering the cutter as it passes along the slot from the center of the sheet to the other side thereof, and cutting through the bottom of the slot with the point of the cutter as the cutter reaches the said other side of the sheet.

HAZEN L. HOYT.